United States Patent
McLeod

[15] 3,676,515
[45] July 11, 1972

[54] PROCESS FOR ALKYLATION OF AROMATIC COMPOUNDS

[72] Inventor: Richard K. McLeod, Dickerson, Tex.
[73] Assignee: Monsanto Company, St. Louis, Mo.
[22] Filed: March 17, 1971
[21] Appl. No.: 125,386

[52] U.S. Cl. ..................260/671 C, 252/442, 260/671 R
[51] Int. Cl. ..................................................C07c 3/56
[58] Field of Search ..................260/671 R, 671 C, 671 P; 252/442

[56] References Cited

UNITED STATES PATENTS

| | | | |
|---|---|---|---|
| 3,004,082 | 10/1961 | Meisinger | 252/442 |
| 3,205,276 | 9/1965 | Toland | 260/671 P |
| 3,370,101 | 2/1968 | Hayes et al. | 260/671 R |
| 3,381,050 | 4/1968 | Bodre | 260/671 R |
| 3,420,909 | 1/1969 | Schmerling | 260/671 R |

Primary Examiner—Curtis R. Davis
Attorney—Thomas B. Leslie et al.

[57] ABSTRACT

Aromatic compounds are alkylated with olefins in the presence of a complex catalyst formed by reacting an alloy comprising mercury and aluminum with a hydrogen halide in a hydrocarbon medium.

15 Claims, No Drawings

PROCESS FOR ALKYLATION OF AROMATIC COMPOUNDS

BACKGROUND OF THE INVENTION

This invention relates to the alkylation of aromatic compounds. More particularly, the present invention relates to an improved process for the alkylation of aromatic hydrocarbons and to an improved catalyst therefor. In still another aspect, this invention relates to an improved method for preparing an aluminum halide-aromatic hydrocarbon complex catalyst.

For several years alkylation of aromatic hydrocarbons has been of great importance in changing aromatic hydrocarbons from one form to other forms more useful in various chemical process and manufacturing industries. Two of the more important processes involve the alkylation of benzene with ethylene or propylene to form ethylbenzene or cumene. Ethylbenzene is utilized in large quantities in dehydrogenation processes for the manufacture of styrene. Cumene may be converted to cumene hydroperoxide which is readily decomposed into phenol and acetone. Alkylated aromatics are also of value in many other fields and some are particularly desirable as constituents of high octane fuels and as sources of synthetic detergents.

Among the catalysts which are useful in these alkylation reactions are the aluminum halide-aromatic hydrocarbon complex catalysts. These complex catalysts have been used for many years and may be formed in various manners, one being the reaction of aluminum metal with a hydrogen halide in an aromatic hydrocarbon medium so that an aluminum halide is formed which in turn forms a complex catalyst with the hydrocarbon.

The hydrocarbon medium may be a mixture comprising aromatic hydrocarbon, alkylated aromatic hydrocarbon and recycled complex catalyst. In the instance of benzene alkylation to principally ethylbenzene, the medium may contain benzene, ethylbenzene, polyethylbenzenes or mixtures of these with or without recycled complex catalyst. Such recycled catalyst normally contains a considerable amount of dissolved hydrogen halide used to promote the aforementioned alkylation reactions. Aluminum metal may be charged to the hydrocarbon medium and anhydrous hydrogen halide such as hydrogen chloride added until substantially all aluminum metal has reacted and the aluminum halide-hydrocarbon complex catalyst formed.

If benzene is utilized as principal component of the aromatic hydrocarbon medium, alkylation with an ethylenically unsaturated hydrocarbon such as ethylene may proceed in place or the resulting complex catalyst-bearing hydrocarbon medium may be transferred to a separate alkylation zone for alkylation. Where the hydrocarbon medium contains principally alkylated aromatic hydrocarbons, the resulting complex catalyst may be admixed with alkylatable aromatic hydrocarbon and alkylated in the manner previously described. In the various combinations of starting materials, recycled complex catalyst may be a component of the hydrocarbon medium.

While these methods of forming aluminum halide-aromatic hydrocarbon complex catalysts are used in industry, they suffer the disadvantage that deleterious amounts of naphthenic and other non-aromatic compounds are formed in conjunction with formation of the complex catalyst. Typically, these compounds may include alkyl cyclopentanes and alkyl cyclohexanes. When a complex catalyst containing these non-aromatic impurities is utilized in alkylation of an aromatic compound, the non-aromatics contaminate the alkylated aromatics produced in the alkylation reaction as well as derivatives made therefrom. Since contamination of the alkylated aromatics with even small quantities of non-aromatics is undesirable, any change in catalysts which will result in a decrease of non-aromatic content is greatly desired.

One such change in complex catalyst is disclosed by Robert J. Bodre in U.S. Pat. No. 3,381,050 wherein a complex catalyst is formed by reacting an anhydrous hydrogen halide with an aluminum-copper alloy in a hydrocarbon medium. Such alloy contains aluminum and copper in preferred weight ratios of from about 7:1 to about 200:1. The reference further discloses that complex catalysts containing very low amounts of non-aromatic compounds are formed by utilizing aluminum-copper alloys containing copper in excess of 4 weight percent.

The aforementioned aluminum-copper alloy poses certain disadvantages, however. Since the copper is only useful in the form of the alloy and not as the free metal or copper ion and the alloyed aluminum is largely reacted with the hydrogen halide, fresh aluminum-copper alloy must be supplied to prepare each fresh batch or continuous increment of catalyst complex. Likewise, due to its essentially metallurgical origin and primary use in metal-working industries, the aluminum-copper alloy is not customarily prepared for, or in conjunction with, alkylation processes. Accordingly, the availability of such alloys is usually dependent upon conditions beyond the control of the chemical processor. It is desirable, therefore, not only to utilize a complex catalyst in alkylation processes that will result in decreased non-aromatic compound content in such complex catalyst and thereby in the alkylate produced, but also to employ an alloy which is subject to recycle or reuse in the catalyst forming reaction by simple addition of aluminum metal. In addition, it is desirable to obtain such a catalyst that can be prepared from commonly available materials.

SUMMARY OF THE INVENTION

It is therefore an object of the present invention to provide an improved process for the alkylation of alkylatable aromatic compounds. It is also an object of the present invention to provide an improved catalyst for the alkylation of aromatic compounds. A further object of the present invention is to provide an improved process and catalyst for the alkylation of aromatic compounds in which the formation of non-aromatic compounds is minimized. A still further object of the present invention is to provide a modified aluminum halide-aromatic hydrocarbon complex catalyst that can be prepared from materials which can be regenerated in situ and a process therefor. Yet another object of the present invention is to provide such a modified complex catalyst that can be prepared from commonly available materials as well as a process therefor. Other objects and advantages of the invention will be apparent to those skilled in the art from the following detailed description and claims.

The present invention in one of its embodiments is a catalyst particularly useful for the alkylation of aromatic compounds, which catalyst has been formed by reacting an alloy comprising aluminum and mercury with a hydrogen halide in an aromatic hydrocarbon medium. In another embodiment, the present invention is a process for the alkylation of an alkylatable aromatic compound which comprises contacting an alkylatable aromatic compound and an ethylenically unsaturated hydrocarbon under alkylating conditions with a complex catalyst formed by reacting an alloy comprising aluminum and mercury with a hydrogen halide in an aromatic hydrocarbon medium.

PREFERRED EMBODIMENTS OF THE INVENTION

The complex catalyst of the present invention is formed by reacting a hydrogen halide with an aluminum-mercury alloy in an aromatic hydrocarbon medium. The nature of the catalyst so produced is not fully understood; however, it appears that aluminum is a sacrificial metal which reacts with the hydrogen halide and hydrocarbons so as to form an aluminum halide-hydrocarbon complex which functions as the alkylation catalyst. Little or no mercury is dissolved in the catalyst complex and hence is available to reform its alloy or amalgam with fresh aluminum metal. The presence of mercury in the aluminum-mercury alloy is necessary only to suppress the side reactions which result in the formation of undesirable non-aromatic by-products during the formation of the catalyst complex.

The hydrogen halide used in the formation of the complex catalyst is preferably hydrogen chloride, although hydrogen bromide and hydrogen fluoride can be used. Hydrogen fluoride is the least preferred hydrogen halide for the catalyst of the present invention.

The complex catalyst of the present invention can be formed in situ in the alkylation zone by utilizing an alkylatable aromatic hydrocarbon, optionally with recycled hydrogen halide-bearing complex catalyst, as the hydrocarbon medium, placing the aluminum-mercury alloy, or alternatively charging aluminum and mercury or a reducible mercury salt, into the hydrocarbon medium and adding a hydrogen halide thereto. The complex can also be prepared outside the alkylation zone in a different reaction zone by reacting the aluminum-mercury alloy, or aluminum metal and mercury or a reducible mercury salt, with the hydrogen halide in a suitable hydrocarbon medium and then transferred to the alkylation zone. The complex can further be prepared by utilizing principally alkylated aromatic hydrocarbons or mixtures thereof, again optionally with recycled hydrogen halide complex catalyst, and adding thereto aluminum-mercury alloy, or aluminum and mercury or a reducible mercury salt, and hydrogen halide as described. Additional aluminum and hydrogen halide can be added to the hydrocarbon medium in any order or relative amounts without adversely affecting the catalyst complex formed. The further addition of mercury salts or mercury-aluminum alloy is not required since mercury metal is freed for alloying with fresh aluminum as the initial aluminum present is reacted with the hydrogen halide.

The complex catalysts of the present invention are generally formed at temperatures of from about 40° C. to about 100° C. and, preferably, from about 65° C. to about 85° C. The pressure is generally sufficient to maintain the hydrocarbon medium used in formation of the complex catalyst substantially in liquid phase. However, any hydrocarbon medium which is vaporized can be condensed and returned to the reaction product without affecting the catalyst complex. While complex catalyst preparation is normally carried out under approximately atmospheric pressure in the reaction zone, pressures may range from about 0.5 to about 50 atmospheres. The aluminum halide content of the resulting complex catalyst is generally in the range of about 15 to about 40 weight percent of the complex, preferably from about 20 to about 30 weight percent.

The alloy or amalgam of aluminum and mercury used to form the complex catalyst of the present invention generally contains mercury in the amount of 0.01 to 10 mol percent or a mol ratio of aluminum to mercury of 10:1 to 10,000:1. Preferred alloys contain from about 0.08 percent to about 45 percent by weight mercury, i.e. weight ratios of aluminum to mercury from 1.3:1 to about 1200:1. These alloys or amalgams may be preformed and so used or they may be formed in a suitable hydrocarbon medium by adding thereto aluminum metal and mercury, or by adding aluminum metal and a reducible mercury salt, such as mercuric chloride. Any form of aluminum metal may be employed to form the initial alloy charge and to add to the complex catalyst-forming reaction when mercury is already present, but those forms exhibiting large surface areas such as metal turnings and granulated metal are preferably used. Granulated aluminum metal of from about 5 to 100 mesh (U. S. standard sieve size) is particularly suitable. Other metals such as magnesium, iron, manganese, zinc, silicon, sodium and the like may also be present in the alloy in small amounts without significantly affecting the alkylation activity of the complex catalyst or formation of non-aromatic compounds. Furthermore, the aluminum metal may contain small amounts of such alloying metals or physically mixed impurities.

Various aromatic hydrocarbon media may be used in formation of the complex catalysts of the present invention. These hydrocarbons may be mononuclear or polynuclear and may be unsubstituted, e.g., benzene, or may be mono- or polysubstituted. With respect to substituted hydrocarbons, a preferred group of compounds are alkyl substituted benzene compounds having from one to six carbon atoms in the alkyl substituent. Further, the substituted hydrocarbons may have either saturated or unsaturated substituents. Several non-limiting examples of useful hydrocarbons are benzene, toluene, ethylbenzene, diethylbenzene, triethylbenzene, styrene, hexyl benzene, naphthalene, o-xylene, m-xylene, p-xylene, the ethyltoluenes, mesitylene, pentadecylbenzene, hexyltoluene, diphenyl, stilbene, anthracene, rubrene and indene. Mixtures of different hydrocarbons may also be used. For a particular alkylation reaction, it is preferred to form the complex catalyst utilizing alkylate produced by that particular reaction as the hydrocarbon medium. For example, if benzene is to be alkylated with ethylene to produce ethylbenzene, ethylbenzene then would be used as the principal component of the hydrocarbon medium to form the complex catalyst of the present invention. In commercial processes alkylate from the alkylation of benzene with ethylene may contain not only ethylbenzene but benzene, polyethylbenzenes, or mixtures thereof as well. These alkylates and mixtures may also be used advantageously in the formation of the complex catalysts of the present invention. The hydrocarbon medium may as well contain hydrogen halide-bearing recycled catalyst complex. In this event, a portion of this dissolved hydrogen halide may be utilized in formation of the complex catalyst and supplemental hydrogen halide added in substantially concurrent manner with the aluminum-mercury alloy and thereafter aluminum.

The aromatics which may be alkylated according to the process of the present invention include both mononuclear and polynuclear aromatic compounds. These aromatics may be substituted with one or more substituents which may be saturated or unsaturated. It is understood, of course, that the aromatic compound must have at least one site on the aromatic nucleus which is available for alkylation. Several non-limiting examples of aromatic compounds which may be alkylated according to the present invention are benzene, toluene, the xylenes, naphthalene, ethylbenzene, the ethyltoluenes, styrene, 1,2,3-trimethylbenzene, mesitylene, normal propylbenzene, dodecylbenzene, pentadecyltoluene, diphenyl, diphenylmethane, fluorene, stilbene, naphthalene, anthracene, phenanthrene, naphthacene, rubrene and indene. The aromatic compounds which may be alkylated according to the present invention also include those having non-hydrocarbon substituents such as hydroxy, alkoxy, halide, nitro and other groups in addition to or instead of the hydrocarbon substituents such as benzyl alcohol, benzyl chloride, nitro chlorobenzene, chlorophenol and others. The present invention is most useful in the alkylation of mononuclear aromatic compounds having from six to 21 carbon atoms, which mononuclear aromatic compounds are preferably hydrocarbons. When a mononuclear aromatic hydrocarbon is to be alkylated, it is then preferred to use at least one mononuclear aromatic hydrocarbon for the formation of the complex catalyst of the present invention.

The alkylating compounds useful in the process of the present invention most often comprise hydrocarbons of two to 20 carbon atoms containing ethylenic unsaturation. The ethylenically unsaturated hydrocarbons include for the purposes of the present invention, mono olefins, diolefins, triolefins, cycloolefins, and aromatic hydrocarbons containing ethylenically unsaturated substituents, e.g., styrene. Several non-limiting examples of the ethylenically unsaturated hydrocarbons include ethylene, propylene, cis-butene-2, n-butene-1, 2-methylbutene-1, isobutylene, trans-pentene-2, propylene tetramer, hexene-1, trans-hexene-2, dodecene-1, octadecene-1, octadecene-2, tetrapropylene, 1,4-hexadiene, 6-cyclohexyldodecene and 1,6,10-dodecatriene. Usual alkylating compounds are the monoolefins containing two to 14 carbon atoms. The preferred alkylating compounds are the monoolefins of two to four carbon atoms, i.e., ethylene, propylene, butylene, isobutylene. The present invention is not limited to alkylating compounds or alkylatable aromatics derived from any particular source or to the purity of the alkylating compound or alkylatable aromatic.

The alkylation process of the present invention can be carried out in the gas phase but it is advantageous to operate in such a manner that at least a considerable portion of the alkylatable aromatic compounds or the alkylation products are present in liquid phase in the alkylation zone. The process may be operated at temperatures between about 20° C. to about 300° C. Preferred alkylation temperatures are from about 60° C. to about 140° C. Generally, pressures are selected so that at least a substantial part of the alkylatable aromatic compound is liquid under reaction conditions. For example, pressures which are suitable may range between atmospheric and lower to 100 atmospheres and higher. Preferred pressures, however, range between 1 and 10 atmospheres. The molar ratio of alkylatable aromatic to olefin is usually maintained within the range of from 1:1 to 10:1, preferably 1.5:1 to 2:1. The complex catalyst is generally present in amounts of about 0.1 to about 4 parts by weight complex catalyst per part by weight of alkylatable aromatic.

Usually it is desirable to use promoters such as ethyl chloride or hydrogen chloride in carrying out the alkylation process of the present invention. If used, promoters will be added in small amounts to either the alkylatable aromatic or the olefin or promoter may be added to the reaction mass itself for purpose of accelerating the reaction. The amount of promoter such as hydrogen chloride ordinarily employed in the alkylation reaction may vary from a minimum of 1 part by weight per 1,000 parts of olefin to 1 part by weight for every 10 parts of olefin. Most beneficial results are obtained when a promoter to olefin weight ratio of 1:100 is employed.

Although the term "alkylation" has been used herein, it is to be understood that this term includes transalkylation reactions such as when mixtures of benzene and polyethylbenzenes undergo transalkylation to form monoethylbenzene. The process of this invention is also applicable for methods where polyalkylated aromatic compounds are returned to the alkylation reaction. Procedures for carrying out such reactions are well known and need no description herein.

The following non-limiting examples will further illustrate practice of the present invention.

EXAMPLE I

This example illustrates the reduction in formation of non-aromatic hydrocarbons in a complex catalyst suitable for alkylation by the addition of mercuric chloride to a reaction zone containing aluminum in an aromatic hydrocarbon medium.

Several catalyst complexes were formed by charging to a stirred reactor 500 ml. (423.5 grams) of ethylbenzene, 0.5 mol (13.5 grams) of granulated aluminum of −20 to +30 mesh and in the first three runs quantities of mercuric chloride ranging from 0.00006 mol (0.016 gram) to 0.05 mol (13.58 grams). In runs A, B and C the ethylbenzene with added aluminum metal was brought to 60° C. while stirring prior to addition of the mercuric chloride and starting charging of the hydrogen chloride. In each run anhydrous hydrogen chloride was bubbled through the stirred reactor at a rate of 1.70 mols (62.2 grams) per hour as measured at standard conditions until all the aluminum was reacted which required approximately a period of 2 hours while the reactor was maintained at 75° C. In all runs with the exception of C and D droplets of mercury were observed which tended to settle to the bottom of the reactor during the last stages of each run. After all the hydrogen chloride had been introduced the reaction mixture was allowed to separate into two phases, the lighter phase being mainly organic and the heavier phase being the catalyst complex. The catalyst complex phase consisted of about 29 percent aluminum chloride and about 3 percent hydrogen chloride with the remainder being organic. In Run C, which used 0.00006 mol of mercuric chloride, the catalyst complex contained a finely divided suspension which was filtered off and analyzed. It was found to comprise mainly chlorine, aluminum and silicon with traces of several other metals but no mercury. The catalyst complex phase and the organic upper phase from each run were analyzed in order to determine the total non-aromatic hydrocarbon content thereof and the results are shown in the following table:

TABLE I

| Run | Moles Al | Moles HgCl$_2$ | Nonaromatic Content-g. | g.NA/g. al[1] |
|---|---|---|---|---|
| A | 0.5 | 0.05 | 6.66 | 0.49 |
| B | 0.5 | 0.005 | 6.06 | 0.45 |
| C | 0.5 | 0.00006 | 8.66 | 0.64 |
| D | 0.5 | – | 17.40 | 1.30 |

[1]NA—Nonaromatic

From the above table it can be seen that in each run where mercuric chloride was employed to form the aluminum-mercury alloy the non-aromatic hydrocarbon content of the catalyst and organic phases and the weight of non-aromatic hydrocarbons formed based on the weight of aluminum present was reduced to one-half or less.

EXAMPLE II

This example illustrates the reduction in formation of non-aromatic hydrocarbons in a complex catalyst suitable for alkylation by the addition of mercury metal to a reaction zone containing aluminum in an aromatic hydrocarbon medium.

Catalyst complexes were formed in the same manner as in Example I above except for charging in Runs E and F 0.013 mol (2.70 grams) and 0.001 mol (0.208 gram), respectively, of mercury metal rather than a mercuric halide after heating 250 ml of ethylbenzene to 70° C. before addition of the aluminum, the remaining 250 ml of ethylbenzene, and mercury. Also, in Runs E F and G there was charged 25 ml of a catalyst complex previously prepared from aluminum chloride and ethylbenzene prior to addition of the mercury. The catalyst complexes formed, consisting of about 28 percent aluminum chloride and about 4 percent hydrogen chloride with the remainder being organic, were separated and analyzed along with the organic phases for non-aromatic hydrocarbon content as in Example I and the results are set out in the following table.

TABLE II

| Run | Moles Al | Moles Hg | Nonaromatic Content-g. | g. NA/g. Al[1] |
|---|---|---|---|---|
| E | 0.5 | 0.013 | 7.11 | 0.53 |
| F | 0.5 | 0.001 | 9.29 | 0.69 |
| G | 0.5 | – | 21.34 | 1.58 |

[1]NA—nonaromatics

From the above table it can be seen that in each run wherein an alloy of aluminum and mercury was employed the amounts of non-aromatic hydrocarbons formed were reduced to less than half the amounts formed when aluminum metal alone was employed.

When each of the catalyst complexes formed from aluminum-mercury alloy is tested by alkylating benzene with ethylene in the presence of a small amount of hydrogen chloride as a promoter they demonstrate good alkylation activity. The benzene and ethylene are present in a mol ratio of 2:1 benzene to ethylene. The alkylations are conducted in a 38 inch long 1 inch diameter continuous reactor packed with glass beads containing about 100 cc of complex catalyst for each run. The temperature of the reactor is maintained at about 85° C. at atmospheric pressure. All of the above catalyst complexes produced from aluminum-mercury alloy are found to be effective for the alkylation and of approximately the same activity, each giving greater than 95 percent conversion of ethylene to ethylbenzene.

What is claimed is:

1. A process for the alkylation of an aromatic compound which comprises contacting in an alkylation zone an alkylatable aromatic compound and an olefin under alkylating conditions, in the presence of a complex catalyst which has been formed by reacting an alloy comprising aluminum and mercury with a hydrogen halide in an aromatic hydrocarbon medium.

2. The process of claim 1 wherein said complex catalyst is formed in said alkylation zone.

3. The process of claim 1 wherein said complex catalyst is formed in a reaction zone separate from said alkylation zone.

4. The process of claim 1 wherein said alkylating conditions include a temperature within the range of 20° C. to 300° C. and pressures sufficient to maintain said alkylatable aromatic hydrocarbon substantially in liquid phase.

5. The process of claim 1 wherein the mol ratio of aluminum to mercury in said alloy is from 10:1 to 10,000:1.

6. The process of claim 1 wherein said mercury is derived from a reducible mercury salt.

7. The process of claim 6 wherein said mercury salt is mercuric chloride.

8. The process of claim 1 wherein said alkylatable aromatic compound is selected from the group consisting of benzene, ethylbenzene, polyethylbenzene, or mixtures thereof and said olefin is a monoolefin containing from two to four carbon atoms.

9. The process of claim 8 wherein said monoolefin is ethylene, said alkylatable aromatic hydrocarbon is benzene, and said hydrogen halide is hydrogen chloride.

10. A process for the formation of a complex catalyst which comprises reacting an alloy comprising aluminum and mercury with a hydrogen halide in an aromatic hydrocarbon medium.

11. The process of claim 10 wherein said aromatic hydrocarbon medium is comprised of at least one alkyl substituted benzene compound, said hydrogen halide is hydrogen chloride, and said complex catalyst is formed within a temperature range of from about 40° C. to about 100° C. and at a pressure sufficient to maintain said aromatic hydrocarbon medium substantially in liquid phase.

12. The process of claim 10 wherein the alloy of aluminum and mercury is formed in said hydrocarbon medium by the addition of aluminum and mercury thereto.

13. The process of claim 10 wherein the alloy of aluminum and mercury is formed in said hydrocarbon medium by the addition of aluminum and a reducible mercury salt thereto.

14. The process of claim 13 wherein said reducible mercury salt is mercuric chloride.

15. The process of claim 10 wherein the mol ratio of aluminum to mercury in said alloy is from 10:1 to 10,000:1.

* * * * *